United States Patent
Smith et al.

(10) Patent No.: US 11,611,974 B2
(45) Date of Patent: Mar. 21, 2023

(54) STATE RESPONSIVE UPLINK OFDMA SCHEDULING

(71) Applicant: Cisco Technology, Inc., San Jose, CA (US)

(72) Inventors: Malcolm M. Smith, Richardson, TX (US); Guru Prasanna Gopalakrishnan, San Jose, CA (US); Sanjay K. Katabathuni, Fremont, CA (US); Venkataprasad Chirreddy, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 35 days.

(21) Appl. No.: 17/133,471

(22) Filed: Dec. 23, 2020

(65) Prior Publication Data
US 2022/0201720 A1    Jun. 23, 2022

(51) Int. Cl.
*H04W 72/12*        (2009.01)
*H04W 28/02*        (2009.01)
*H04W 74/08*        (2009.01)
*H04W 72/1268*      (2023.01)
*H04W 88/08*        (2009.01)

(52) U.S. Cl.
CPC ... *H04W 72/1268* (2013.01); *H04W 28/0278* (2013.01); *H04W 74/0833* (2013.01); *H04W 88/08* (2013.01)

(58) Field of Classification Search
CPC ......... H04W 72/1268; H04W 28/0278; H04W 74/0833; H04W 88/08
See application file for complete search history.

(56) References Cited

U.S. PATENT DOCUMENTS

| | | | |
|---|---|---|---|
| 2008/0232260 A1 | 9/2008 | Yeo et al. | |
| 2017/0202023 A1* | 7/2017 | Zhou | H04W 72/12 |
| 2017/0332385 A1* | 11/2017 | Shirali | H04W 28/0268 |
| 2018/0076942 A1* | 3/2018 | Nory | H04L 1/1861 |
| 2018/0191541 A1 | 7/2018 | Fang et al. | |
| 2018/0324823 A1* | 11/2018 | Martin | H04L 5/0053 |
| 2019/0037595 A1* | 1/2019 | Cherian | H04W 74/08 |
| 2020/0029350 A1 | 1/2020 | Asterjadhi et al. | |
| 2020/0084716 A1 | 3/2020 | Choi et al. | |

OTHER PUBLICATIONS

Bai, Jiyang, "Performance Enhancement of IEEE 802.11AX in Ultra-Dense Wireless Networks" (2018). Electronic Thesis and Dissertation Repository. 5938. https://ir.lib.uwo.ca/etd/5938.

(Continued)

*Primary Examiner* — Dinh Nguyen
(74) *Attorney, Agent, or Firm* — Patterson + Sheridan, LLP

(57) ABSTRACT

Techniques for uplink scheduling in a wireless network are disclosed. A wireless access point (AP) receives, from a wireless station (STA), a buffer status report (BSR) reflecting data accumulated at the STA for uplink to the AP. The AP identifies, based on the BSR, a scheduling mode under which the data was accumulated at the STA. The AP schedules an uplink parameter for the STA, based on the identified scheduling mode. The uplink parameter relates to at least one of: (i) an uplink transmission for the STA or (ii) a buffer status poll for the STA. The AP transmits, to the STA, an allocation relating to the scheduled uplink parameter for the STA.

17 Claims, 8 Drawing Sheets

(56) References Cited

OTHER PUBLICATIONS

Bellalta et al., "AP-initiated multi-user transmissions in IEEE 802.11az WLANS," AD Hoc Networks—Feb. 2017.
Bai Jiayang et al, "An adaptive grouping scheme in ultra-dense IEEE 802.11ax network using buffer state report based two-stage mechanism," China Communications, China Institute of Communications, vol. 16, No. 9, Sep. 1, 2019, pp. 31-44.
PCT, Notification of Transmittal of The International Search Report and The Written Opinion of The International Searching Authority, or The Declaration for Application PCT/US2021/072899 dated Apr. 8, 2022.

\* cited by examiner

STATE RESPONSIVE UPLINK OFDMA SCHEDULING

TECHNICAL FIELD

Embodiments presented in this disclosure generally relate to wireless communication networks. More specifically, one or more embodiments disclosed herein relate to state responsive uplink scheduling in a wireless network.

BACKGROUND

Wireless stations (STAs) can use a variety of different techniques for uplink (UL) transmission to an access point (AP). For example, an STA can use random access (RA) transmission to transmit data to an AP. Using RA, however, can result in contention in transmission, and wasted transmission time as an STA waits for a transmission channel to clear (e.g., while the channel is being used by another STA).

As another example, STAs can use a multi-user (MU) trigger-based (TB) transmission ability based on scheduling and resource allocation by an AP (e.g., as introduced in 802.11ax). In this example, an AP schedules MU uplink transmission by various STAs after querying current load at the STAs. An AP can query current load for an STA (e.g., per Access Category (AC)/Traffic Identifier (TID) queue depth (QDepth)) with buffer-status-report (BSR) poll (BSRP) messages. The STA can then schedule and trigger UL MU transmissions in the future, by the STA, accordingly. This scheduled access (SA) approach is effective in some circumstances, but as described further below it can be ineffective in many real-life scenarios and can be improved using one or more techniques described herein.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
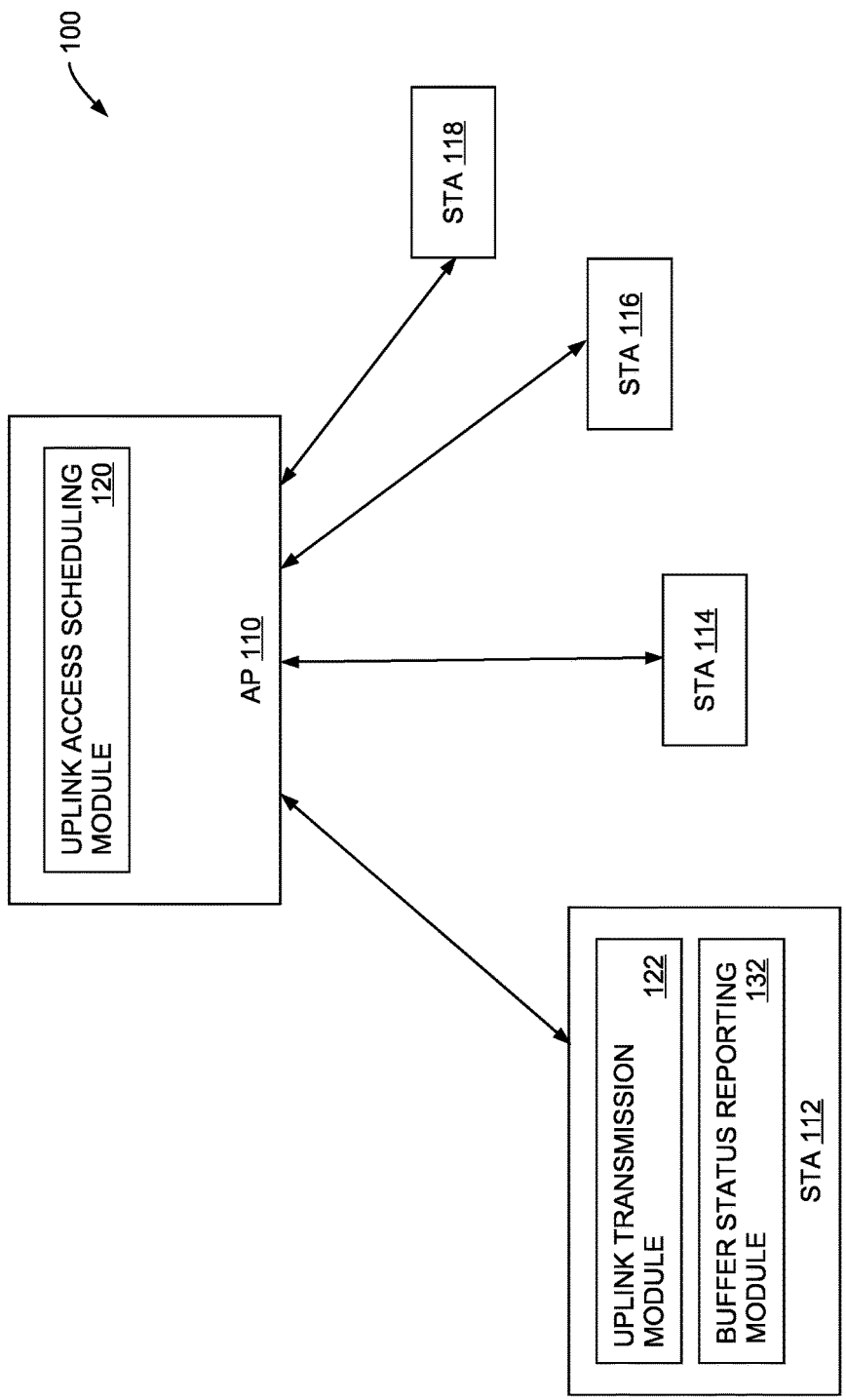
FIG. 1 illustrates state responsive uplink scheduling in a wireless network, according to one embodiment described herein.

Embodiments include a method. The method includes receiving, at a wireless access point (AP) from a wireless station (STA), a buffer status report (BSR) reflecting data accumulated at the STA for uplink to the AP. The method further includes identifying, at the AP based on the BSR, a scheduling mode under which the data was accumulated at the STA. The method further includes scheduling, at the AP, an uplink parameter for the STA, based on the identified scheduling mode. The uplink parameter relates to at least one of: (i) an uplink transmission for the STA or (ii) a buffer status poll for the STA. The method further includes transmitting, from the AP to the STA, an allocation relating to the scheduled uplink parameter for the STA.

Embodiments further include a computer program product. The computer program product includes a non-transitory computer-readable storage medium having computer-readable program code embodied therewith, the computer-readable program code executable by one or more computer processors to perform an operation. The operation includes receiving, at an AP from an STA, a BSR reflecting data accumulated at the STA for uplink to the AP. The operation further includes identifying, at the AP based on the BSR, a scheduling mode under which the data was accumulated at the STA. The operation further includes scheduling, at the AP, an uplink parameter for the STA, based on the identified scheduling mode, wherein the uplink parameter relates to at least one of: (i) an uplink transmission for the STA or (ii) a buffer status poll for the STA. The operation further includes transmitting, from the AP to the STA, an allocation relating to the scheduled uplink parameter for the STA.

Embodiments further include an AP. The AP includes a processor and a memory storing a program, which, when executed on the processor, performs an operation. The operation includes receiving, at an AP from an STA, a BSR reflecting data accumulated at the STA for uplink to the AP. The operation further includes identifying, at the AP based on the BSR, a scheduling mode under which the data was accumulated at the STA. The operation further includes scheduling, at the AP, an uplink parameter for the STA, based on the identified scheduling mode, wherein the uplink parameter relates to at least one of: (i) an uplink transmission for the STA or (ii) a buffer status poll for the STA. The operation further includes transmitting, from the AP to the STA, an allocation relating to the scheduled uplink parameter for the STA.

Example Embodiments

As discussed above, wireless communication networks can implement multi-user (MU) trigger-based (TB) transmission ability uplink techniques, in which an access point (AP) schedules MU uplink transmission by various wireless stations (STAs) based on querying current load at the STAs. For example, an AP can query current load for an STA (e.g., per Access Category (AC)/Traffic Identifier (TID) queue depth (QDepth)) with buffer-status-report (BSR) poll (BSRP) messages. The STA can then schedule and trigger UL MU transmissions in the future, by the STA, accordingly.

While current scheduled access (SA) techniques (e.g., MU-TB uplink techniques) are sufficient in some circumstances, they can be ineffective in wireless communication networks where an STA can opt out of the scheduled transmission, and can transmit data to an AP using random access (RA) (e.g., as allowed in 802.11ax). As one example, an STA may indicate that it does not support uplink MU scheduling, at all, in which case SA is not triggered. As another example, an STA can accept uplink scheduling from the AP, but may still accumulate and transmit data in RA in some circumstances. In this example, an AP can implement a MU timeout (e.g., a multi-user enhanced distribution channel access (MU-EDCA) timeout). An STA choosing to use MU uplink uses SA, and not RA, during the duration of the timeout. Before the timeout concludes, the AP may choose to transmit an additional scheduling message to the STA that provides further scheduling information and resets the timeout. But an STA may still accumulate and transmit data in RA, for example where the timeout expires.

The MU SA approach in existing systems ignores the choice of an STA to operate in RA mode. As explained further below, this can result in less efficient and less effective uplink scheduling by the AP because it can lead the AP to incorrectly assess the scheduling needs of the STA. For example, in 802.11ax, demand information for an STA is limited to per TID/AC QDepth, learned from an AP triggered solicited BSR, or a non-AP triggered unsolicited BSR (e.g., an STA report). The AP assumes that the received BSR from an STA represents accumulated load between reports (e.g., between solicited or unsolicited reports) and cannot determine whether data was actually accumulated under SA or RA. But the source of accumulation (e.g., whether the data for uplink is accumulated while the STA is operating in RA or SA mode), and the reporting method (e.g., solicited BSR or unsolicited BSR), are key differentiators for uplink scheduling by an AP because, as discussed below, an AP can use this information to more accurately determine whether an STA is being underserved, overserved, or correctly served in its current scheduling allocation. In an embodiment, an STA can include an identifier in a BSR indicating whether the accumulated data in the BSR was accumulated while operating in RA or SA mode. An AP can parse the BSR, and use this identifier to improve uplink scheduling for the STA.

FIG. 1 illustrates state responsive uplink scheduling in a wireless network, according to one embodiment described herein. A wireless network 100 includes an AP 110 and four STAs 112, 114, 116, and 118. In an embodiment, the STAs 112, 114, 116, and 118 can be any suitable wireless network station, including a laptop or desktop computer, a workstation or server, a smartphone, a tablet, an Internet of Things (IoT) device, or any other suitable STA. The AP 110 is wirelessly connected to each of the STAs 112, 114, 116, and 118 using a suitable wireless network connection, including any suitable Wi-Fi connection (e.g., an 802.11ax connection), or any other suitable wireless technology.

Each STA 112, 114, 116, and 118 can both receive data from the AP 110 (a downlink connection) and transmit data to the AP 110 (an uplink connection). In an embodiment, the AP 110 schedules both downlink communication (from the AP 110 to the respective STAs 112, 114, 116, and 118) and uplink communication (from a given one of the STAs 112, 114, 116, and 118 to the AP 110). Further, in an embodiment, one or more of the STAs 112, 114, 116, and 118 can communicate with each other (e.g., through the AP 110).

In an embodiment, the AP 110 includes an uplink access scheduling module 120 which facilitates scheduling of uplink communication from the STAs 112, 114, 116, and 118. For example, the uplink access scheduling module 120 can implement the MU SA techniques described in 802.11ax and discussed further below in regard to FIGS. 2-6.

In an embodiment, the STA 112 includes an uplink transmission module 122 and a buffer status reporting module 132. In an embodiment, the uplink transmission module manages uplink data transmission from the STA 112 to the AP 110. The buffer status reporting module 132 manages reporting of buffer status for the STA 112 to the AP 110. For example, the buffer status reporting module 132 can identify a scheduling mode in which data is accumulated at the STA (e.g., RA or SA) and can add a scheduling mode identifier to the BSR identifying this scheduling mode. The AP 110 can parse the BSR and use the scheduling mode identifier to improve uplink scheduling for the STA 112. This is discussed further below in regard to FIGS. 2-6.

Figure 2:
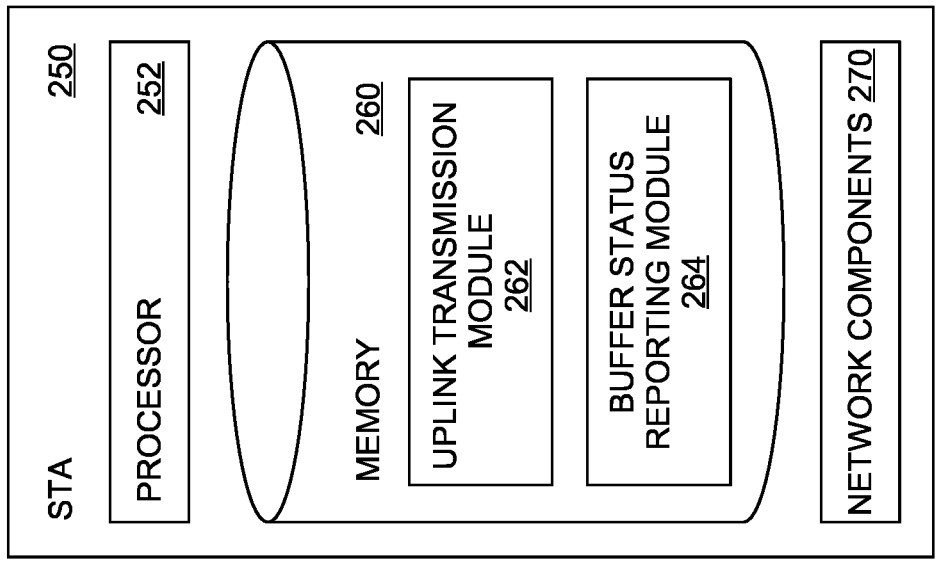
FIG. 2 is a block diagram illustrating an AP and a wireless station for state responsive uplink scheduling in a wireless network, according to one embodiment described herein.
Figure 2:
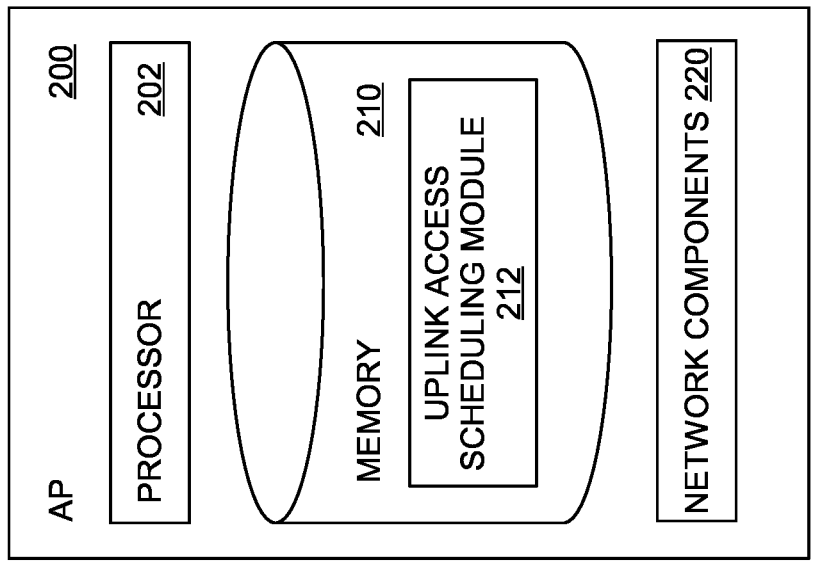

FIG. 2 is a block diagram illustrating an AP 200 and a wireless STA 250 for state responsive uplink scheduling in a wireless network, according to one embodiment described herein. The AP 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the AP 200 to interface with a wireless communication network, as discussed above in relation to FIG. 1. For example, the network components 220 can include WiFi or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the AP 200. The program code is generally described as various functional "applications" or "modules" within the memory 210, although alternate implementations may have different functions and/or combinations of functions. Within the memory 210, the uplink access scheduling module 212 manages uplink transmission scheduling from STAs to APs, as discussed further in relation to FIG. 3 and after.

The STA 250 includes a processor 252, a memory 260, and network components 270. The processor 252 generally retrieves and executes programming instructions stored in the memory 260. The processor 252 is representative of a single central processing unit (CPU), multiple CPUs, a single CPU having multiple processing cores, graphics processing units (GPUs) having multiple execution paths, and the like.

The network components 270 include the components necessary for the STA 250 to interface with a wireless communication network, as discussed above in relation to FIG. 1. For example, the network components 270 can include WiFi or cellular network interface components and associated software. Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory.

The memory 260 generally includes program code for performing various functions related to use of the STA 250. The program code is generally described as various functional "applications" or "modules" within the memory 260, although alternate implementations may have different functions and/or combinations of functions. Within the memory 260, the uplink transmission module 262 manages uplink data transmission from the STA to an AP (e.g., the AP 200), as discussed further in relation to FIG. 3 and after. The buffer status reporting module manages reporting of buffer status for the STA to an AP (e.g., the AP 200), as discussed further in relation to FIG. 3 and after.

Figure 3:
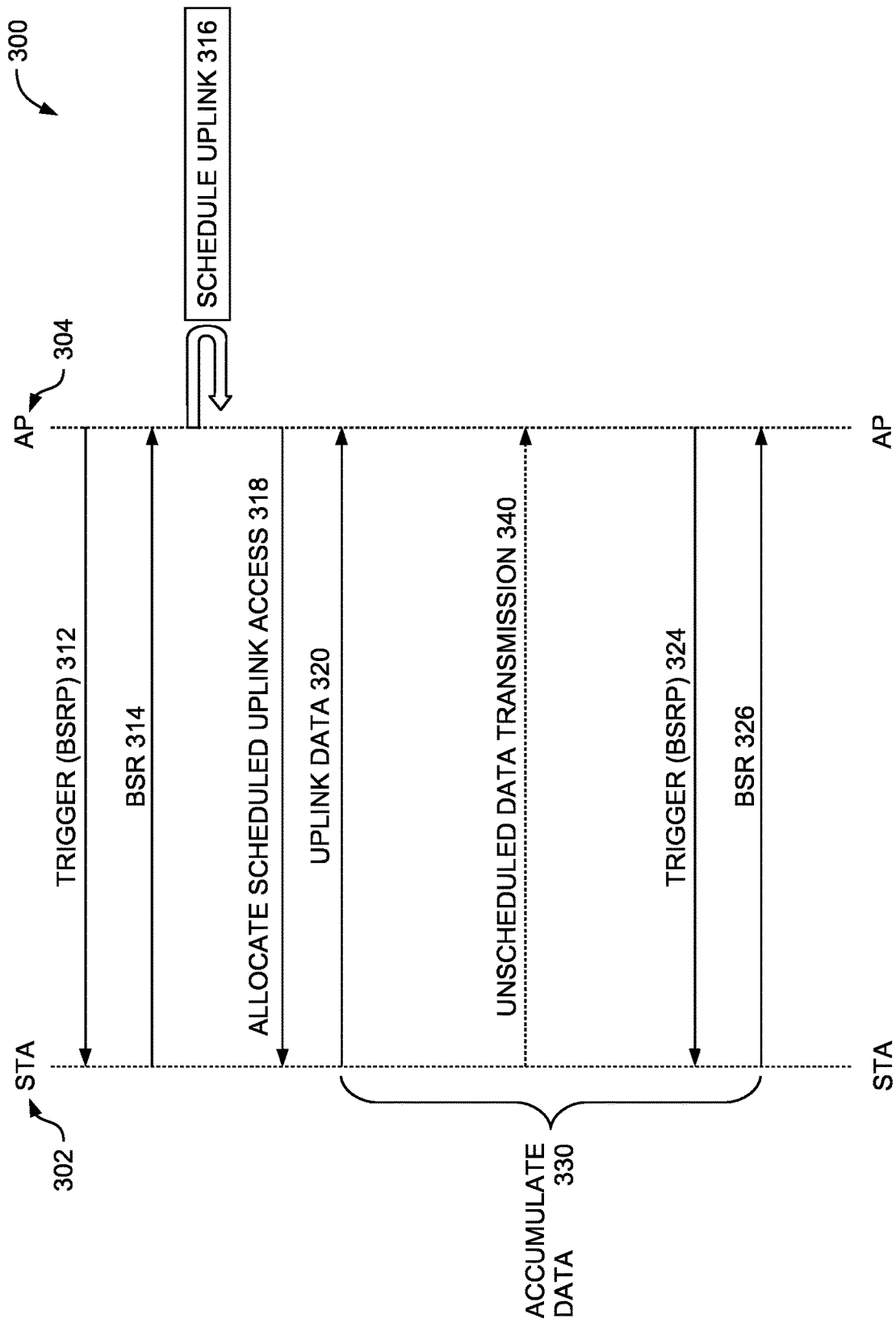
FIG. 3 illustrates wireless network messaging for uplink scheduling in a wireless network, according to one embodiment described herein.

FIG. 3 illustrates wireless network messaging for uplink scheduling in a wireless network, according to one embodiment described herein. A network 300 includes an STA 302 (e.g., the STA 250 illustrated in FIG. 2) and an AP 304 (e.g., the AP 200 illustrated in FIG. 2). In an embodiment, the AP 304 coordinates MU trigger-based uplink communication from the STA 302 to the AP 304. For example, the AP 304 can implement WiFi 802.11ax, and can provide scheduling and resource allocation (e.g., resource block allocation for orthogonal frequency-division multiple access (OFDMA) communication) for uplink communication by the STA 302.

In an embodiment, the AP 304 transmits a trigger frame 312 to the STA 302. The trigger frame 312 can trigger the STA 302 to use SA for uplink communication. Further, in an embodiment, the trigger frame 312 can be a BSRP message transmitted from the AP 304 and indicates to the STA 302 that the STA 302 should transmit a solicited BSR to the AP.

The STA 302 transmits a solicited BSR 314 to the AP 304. In an embodiment, the BSR 314 indicates the amount of buffered traffic in a queue of the STA 302. At block 316, the AP 304 schedules uplink communication from the STA 302 to the AP 304. As discussed above, in an embodiment, this includes timing, resource unit (RU) allocation for OFDMA communication, and any other suitable scheduling.

The AP 304 transmits a message 318 allocating scheduled uplink access from the STA 302 to the AP 304. The STA 302 then transmits data 320 to the AP 304, according to the allocated schedule information provided at 318.

At 330, the STA 302 accumulates data for uplink transmission to the AP 304. In an embodiment, the STA 302 operates in SA, and waits for a trigger frame before transmitting uplink data to the AP 304. The AP transmits a trigger frame 324 (e.g., a BSRP). The STA 302 responds by transmitting a solicited BSR 326. In an embodiment, the BSR 326 indicates the amount of data accumulated at 330. The flow then repeats, with the AP 304 scheduling uplink communication and the STA 302 transmitting data to the AP 304 (e.g., as discussed above with regard to 316, 318, and 320).

As discussed above, in an embodiment the STA continues to operate in SA after transmitting the data at 320, and the BSR 326 indicates the amount of data accumulated at the STA 302 between transmitting data at 320 and transmitting the BSR 326. The AP 304 relies on the accuracy of the BSR and uses it to schedule uplink communication (e.g., to determine how frequently the STA 302 should transmit data to the AP 304 and to allocate resource units for the STA 302 to use for uplink communication). A BSR indicating a large amount of data in the STA 302 queue indicates that the STA 302 is likely underserved. A BSR indicating a small amount of data in the STA 302 queue indicates that the STA 302 may be overserved.

In an embodiment, however, the STA is permitted to intermittently operate in RA instead of SA (e.g., as discussed above). For example, if the STA 302 is not being served sufficiently by the AP 304, and accumulates too much data between scheduled uplink transmissions, the STA can switch to RA and transmit an unscheduled data transmission 340 to the AP 304. In an embodiment, this can empty the queue at the STA 302. The BSR 326 will then indicate only the data accumulated between the STA 302 transmitting the unscheduled data transmission 340 and the BSR 326. That is, the BSR 326 does not include the data accumulated between the STA 302 transmitting the uplink data 320 and the STA 302 transmitting the unscheduled data transmission 340.

Figure 4A:
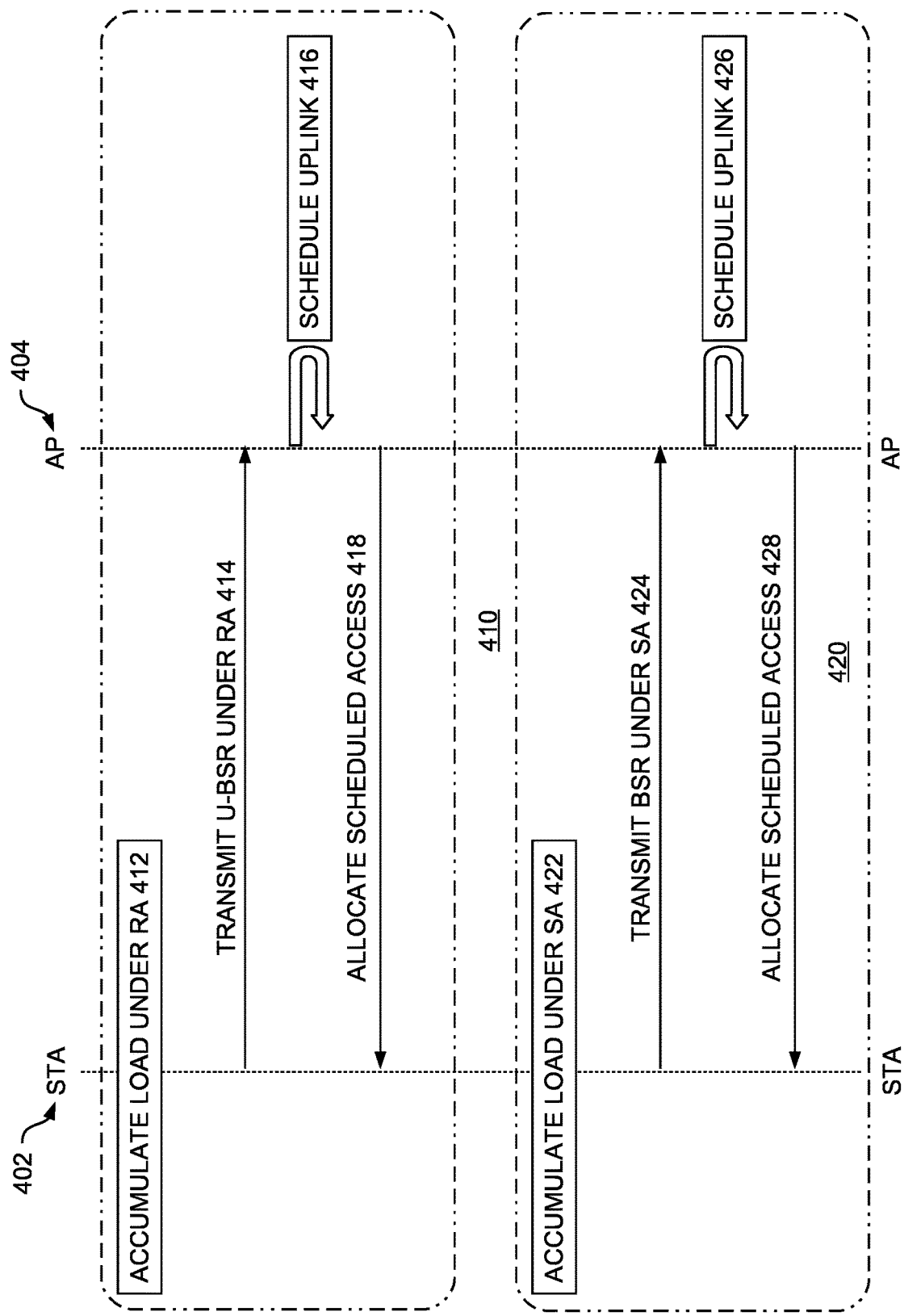
FIG. 4A illustrates wireless network messaging for state responsive uplink scheduling in a wireless network, according to one embodiment described herein.
Figure 4B:
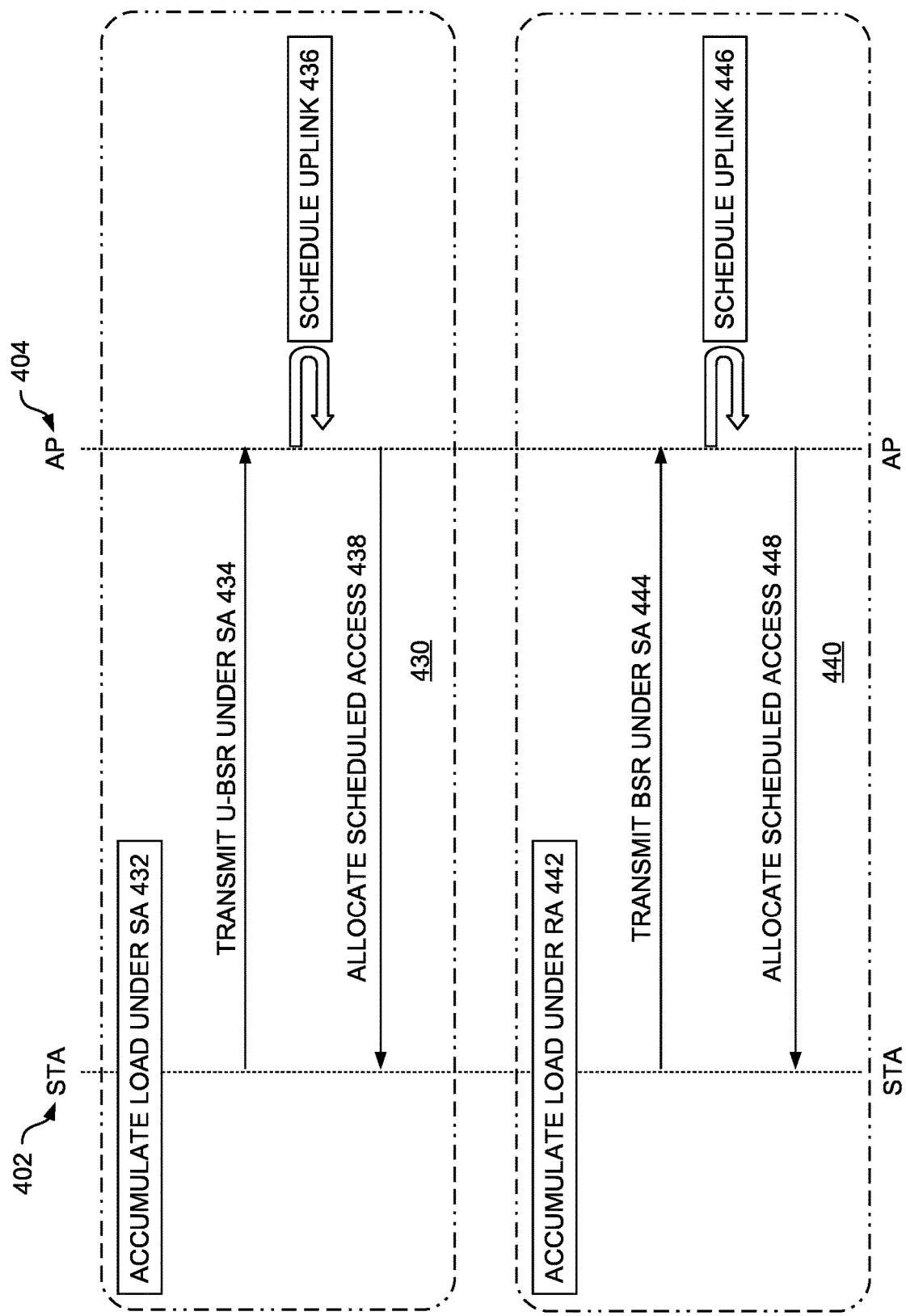
FIG. 4B further illustrates wireless network messaging for state responsive uplink scheduling in a wireless network, according to one embodiment described herein.
Figure 4C:
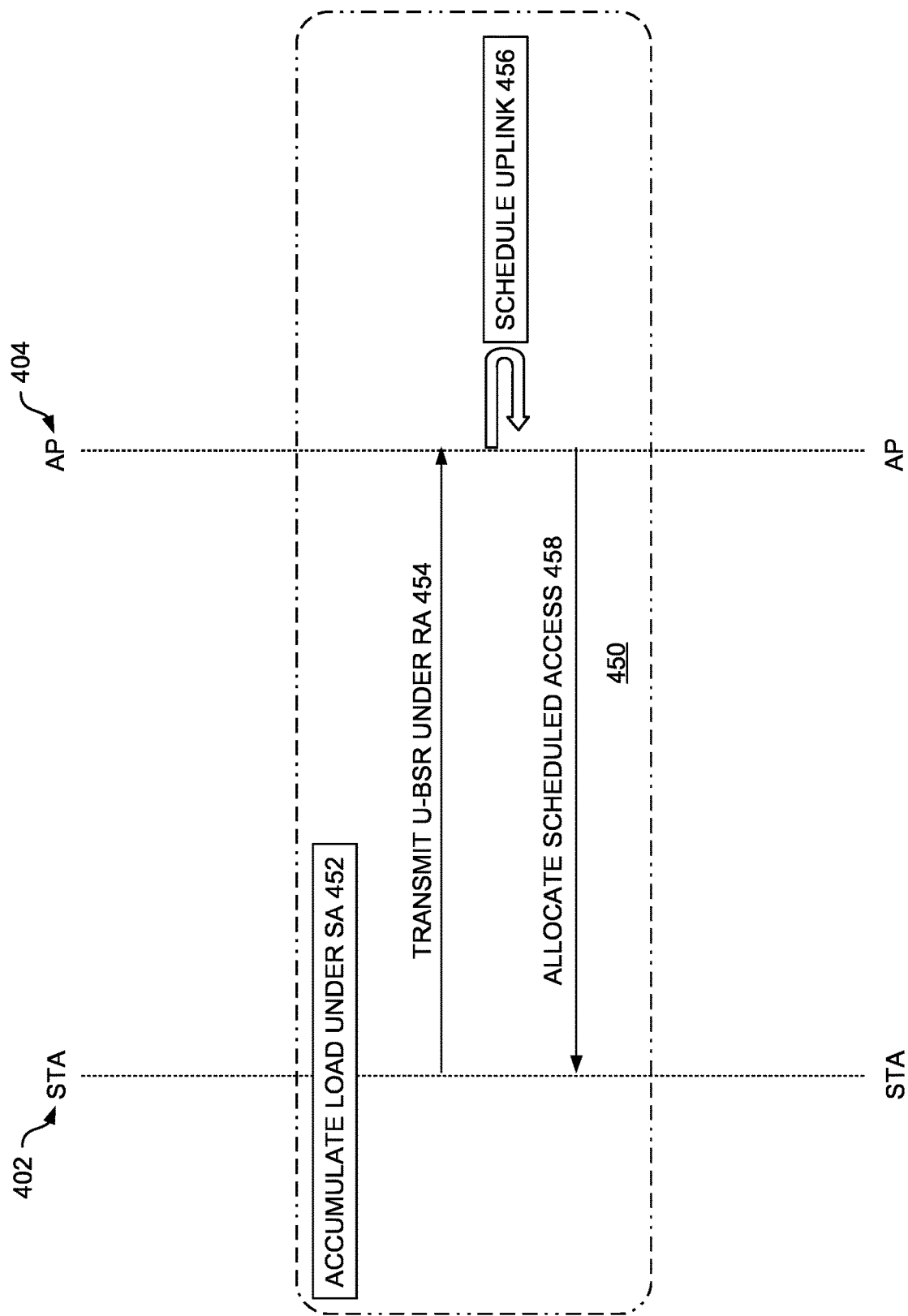
FIG. 4C further illustrates wireless network messaging for state responsive uplink scheduling in a wireless network, according to one embodiment described herein.

This BSR 326, following the unscheduled data transmission 340, does not accurately indicate to the AP 304 the quantity of data accumulated at the STA during the period 330, because the queue is emptied by the unscheduled data transmission 340. This can have a significant detrimental effect on scheduling. The AP 304 can, for example, schedule uplink transmission for the STA 302 based on the assumption that the STA is being sufficiently served (e.g., because the BSR 326 indicates a relatively small queue at the STA 302). But this is incorrect. The STA 302 is actually underserved, which caused the STA 302 to provide the unscheduled data transmission 340. The AP 304 will likely continue to underserve the STA 302, triggering further unsolicited data transmission and further inaccurate scheduling. This is merely one example of inaccurate scheduling at the AP 304 based on inaccurate understanding of BSR data. FIGS. 4A-C, below, identify multiple additional problematic scenarios.

FIG. 4A illustrates scenarios for wireless network messaging for state responsive uplink scheduling in a wireless network, according to one embodiment described herein. As discussed above, existing SA uplink techniques (e.g., as implemented in 802.11ax) implicitly assumes that a BSR received at an AP from an STA represents accumulated load between either solicited reports or unsolicited reports. That is, in existing SA uplink techniques the AP makes scheduling decisions implicitly assuming that data accumulated between BSRs is accumulated under a consistent scheme (either SA or RA) between the reports: data accumulated between unsolicited BSRs is assumed to be accumulated under RA, while data accumulated between solicited BSRs is assumed to be accumulated under SA. But this is not always correct. As illustrated in FIGS. 4A-C, AP scheduling can be significantly improved by identifying the source of accumulated for STAs.

In an embodiment, FIG. 4A illustrates expected scenarios of wireless network messaging for state responsive uplink scheduling in a wireless network. A scenario 410 illustrates a typical RA messaging scenario (e.g., when an STA operates outside an MU-EDCA timeout). At block 412, an STA 402 (e.g., the STA 250 illustrated in FIG. 2) accumulates load under RA. At 414, the STA transmits an unsolicited BSR (U-BSR) under RA to the AP 404 (e.g., the AP 200 illustrated in FIG. 2). In an embodiment, the STA uses the buffer status reporting module 264, illustrated in FIG. 2, to transmit the U-BSR.

At 416, the AP 404 schedules uplink transmission for the STA 402 based on the U-BSR (e.g., using an uplink access scheduling module 212 illustrated in FIG. 2). As discussed above, the AP 404 can perform any suitable uplink scheduling for the STA 402 and other STAs connected to the AP

404, including transmission timing and resource unit allocation for OFDMA transmission. At 418, the AP 404 transmits the allocated schedule access information (e.g., determined at block 416) to the STA 402.

The STA 402 then uses the allocated schedule access information to transmit data to the AP 404 using SA for future transmission (e.g., when the STA 402 operates inside an MU-EDCA timeout). In an embodiment, because the AP 404 receives an unsolicited BSR at 414, the AP 404 expects that data reflected in the unsolicited BSR is accumulated under RA. In scenario 410, this is correct, and so the AP can make correct scheduling decisions.

A scenario 420 illustrates a typical SA messaging scenario (e.g., when an STA operates inside an MU-EDCA timeout). At block 422, the STA 402 accumulates load under SA. At 424, the STA transmits a solicited BSR under SA to the AP 404. At 426, the AP 404 schedules uplink transmission for the STA 402 based on the BSR. As discussed above, the AP 404 can perform any suitable uplink scheduling for the STA 402 and other STAs connected to the AP 404. At 428, the AP 404 transmits the allocated schedule access information (e.g., determined at block 426) to the STA 402.

The STA 402 then uses the allocated schedule access information to transmit data to the AP 404 using SA for future transmission. In an embodiment, because the AP 404 receives a solicited BSR at 424, the AP 404 expects that data reflected in the solicited BSR is accumulated under SA. In scenario 420, this is correct, and so the AP can make correct scheduling decisions.

FIG. 4B further illustrates wireless network messaging for state responsive uplink scheduling in a wireless network, according to one embodiment described herein. In an embodiment, FIGS. 4B and 4C illustrate additional scenarios in which an AP 404 may perform inaccurate scheduling.

A scenario 430 illustrates a messaging scenario in which an STA accumulates load under SA but reports its buffer status using an unsolicited BSR. This could occur, for example, because the STA includes time-sensitive or critical data (e.g., voice traffic). An STA can transmit an unsolicited BSR because of this data criticality for example, if the MU-EDCA timeout set by the AP for SA operation is too long in duration for that TID.

At block 432, the STA 402 accumulates load under SA. At 434, the STA transmits an unsolicited BSR under SA to the AP 404. At 436, the AP 404 schedules uplink transmission for the STA 402 based on the U-BSR. As discussed above, the AP 404 can perform any suitable uplink scheduling for the STA 402 and other STAs connected to the AP 404. At 438, the AP 404 transmits the allocated schedule access information (e.g., determined at block 436) to the STA 402.

The STA 402 then uses the allocated schedule access information to transmit data to the AP 404 using SA for future transmission. In an embodiment, because the AP 404 receives an unsolicited BSR at 434, the AP 404 expects that data reflected in the U-BSR is accumulated under RA. In scenario 430, however, this is incorrect. The data accumulated at 432 is accumulated under SA. This can lead the AP 404 to schedule the STA for inefficient uplink transmission.

For example, as discussed above scenario 430 may reflect an STA 402 that is transmitting critical data (e.g., voice traffic). An AP 404 could facilitate this by adjusting an uplink parameter, including the polling rate or uplink scheduling service priority for the STA 402. The AP 404 can only do this if it knows that the data accumulated at block 432 is accumulated under SA. Thus, as discussed below in relation to FIGS. 5 and 6, in an embodiment the STA 402 can include an identifier in the U-BSR specifying that the data reflected in the U-BSR is accumulated under SA (and not RA). The AP 404 can use this identifier to more efficiently and accurately schedule uplink access for the STA 402.

A scenario 440 illustrates a messaging scenario in which an STA accumulates load under RA but reports its buffer status using a solicited BSR. For example, as discussed above in relation to FIG. 3, after receiving a trigger frame (e.g., a BSRP 312) an AP can transmit a solicited BSR (e.g., the BSR 314). This solicited BSR reflects data accumulated prior to receiving the trigger frame, which could be accumulated under RA.

At block 442, the STA 402 accumulates load under RA. At 444, the STA transmits a solicited BSR under SA to the AP 404. At 446, the AP 404 schedules uplink transmission for the STA 402 based on the BSR. As discussed above, the AP 404 can perform any suitable uplink scheduling for the STA 402 and other STAs connected to the AP 404. At 448, the AP 404 transmits the allocated schedule access information (e.g., determined at block 446) to the STA 402.

The STA 402 then uses the allocated schedule access information to transmit data to the AP 404 using SA for future transmission. In an embodiment, because the AP 404 receives a solicited BSR at 444, the AP 404 expects that data reflected in the BSR is accumulated under SA. That is, the AP 404 could confuse scenario 440 with scenario 420, discussed above. In scenario 440, however, data reflected in the BSR is not accumulated under SA: the data accumulated at 442 is accumulated under RA. This can lead the AP 404 to schedule the STA for inefficient uplink transmission.

For example, the BSR 444 could reflect a large amount of data. The AP 404 could assume that this means the STA 402 is underserved, and could therefore allocate additional resource blocks or transmission slots for the STA 402. But in scenario 440, the data reflected in the BSR 444 is accumulated under RA, and so it may not indicate that the STA 402 is underserved. As discussed below in relation to FIGS. 5 and 6, in an embodiment the STA 402 can include an identifier in the BSR specifying that the data reflected in the BSR is accumulated under RA (and not SA). The AP 404 can use this identifier to more efficiently and accurately schedule uplink access for the STA 402.

FIG. 4C further illustrates wireless network messaging for state responsive uplink scheduling in a wireless network, according to one embodiment described herein. A scenario 450 illustrates a messaging scenario in which an STA accumulates load under SA but reports its buffer status using an unsolicited BSR under RA. For example, an STA 402 could operate under SA, but prematurely terminate an SA cycle (e.g., by hitting an MU-EDCA timeout), causing the STA to enter RA and transmit an unsolicited BSR.

At block 452, the STA 402 accumulates load under SA. At 454, the STA transmits an unsolicited BSR under RA to the AP 404. At 456, the AP 404 schedules uplink transmission for the STA 402 based on the U-BSR. As discussed above, the AP 404 can perform any suitable uplink scheduling for the STA 402 and other STAs connected to the AP 404. At 458, the AP 404 transmits the allocated schedule access information (e.g., determined at block 456) to the STA 402.

The STA 402 then uses the allocated schedule access information to transmit data to the AP 404 using SA for future transmission. In an embodiment, because the AP 404 receives an unsolicited BSR at 454, the AP 404 expects that data reflected in the U-BSR is accumulated under RA. That is, the AP 404 could confuse scenario 450 with scenario 410, discussed above. In scenario 450, however, data reflected in the U-BSR is not accumulated under RA: the data accumulated at 452 is accumulated under SA. This can lead the AP 404 to schedule the STA for inefficient uplink transmission.

For example, the AP 404 may not realize that the STA 402 has prematurely ended a prior SA cycle (e.g., by hitting an MU-EDCA timeout). The AP 404 could incorrectly swap the STA 402 to RA transmission, when it should instead increase the MU-EDCA timeout. As discussed below in relation to FIGS. 5 and 6, in an embodiment the STA 402 can include an identifier in the BSR specifying that the data reflected in the BSR is accumulated under SA (and not RA). The AP 404 can use this identifier to more efficiently and accurately schedule uplink access for the STA 402.

Figure 5:
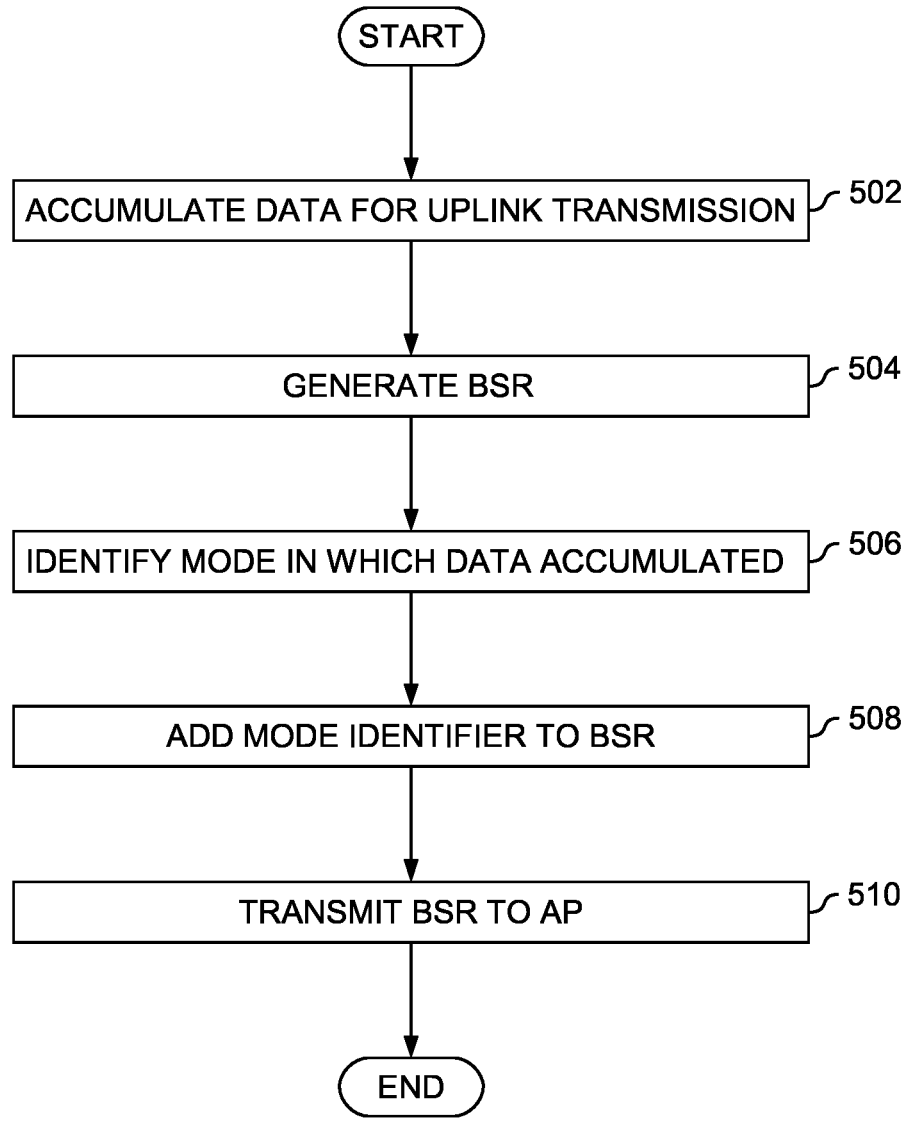
FIG. 5 is a flowchart illustrating state responsive uplink scheduling for an STA in a wireless network, according to one embodiment described herein.

FIG. 5 is a flowchart illustrating state responsive uplink scheduling for an STA in a wireless network, according to one embodiment described herein. At block 502 an STA (e.g., the STA 250 illustrated in FIG. 2) accumulates data for uplink transmission. For example, block 502 can correspond with blocks 412, 422, 432, 442, or 452 illustrated in FIGS. 4A-C. The STA can accumulate data for uplink transmission while operating under RA (e.g., as illustrated in blocks 412 and 442) or while operating under SA (e.g., as illustrated in block 422, 432, and 452).

At block 504, a buffer status reporting module in the STA (e.g., the buffer status reporting module 264 illustrated in FIG. 2) generates a BSR. In an embodiment, the BSR reflects the load accumulated at block 502. The BSR can be a solicited BSR (e.g., provided in response to a BSRP as illustrated in FIG. 3) or an unsolicited BSR.

At block 506, an uplink transmission module in the STA (e.g., the uplink transmission module 262 illustrated in FIG. 2) identifies the scheduling mode in which the data was accumulated. For example, the uplink transmission module can identify whether the data was accumulated (e.g., at block 502) in RA (e.g., as illustrated in blocks 412 and 442 illustrated in FIG. 4A-C) or SA (e.g., as illustrated in blocks 422, 442, and 452).

At block 508, the uplink transmission module adds a scheduling mode identifier to the BSR. In an embodiment, the scheduling mode identifier identifies whether data reflected in the BSR is accumulated under SA or RA. For example, the scheduling mode identifier can be a flag added to the BSR. The identifier can be a single bit, a field of bits, or any other suitable identifier.

At block 510, the uplink transmission module transmits the BSR to an AP (e.g., the AP 200 illustrated in FIG. 2). As discussed above in relation to FIGS. 4A-C, and below in relation to FIG. 6, the AP can use the scheduling mode identifier in the BSR for scheduling uplink access for the STA.

Figure 6:
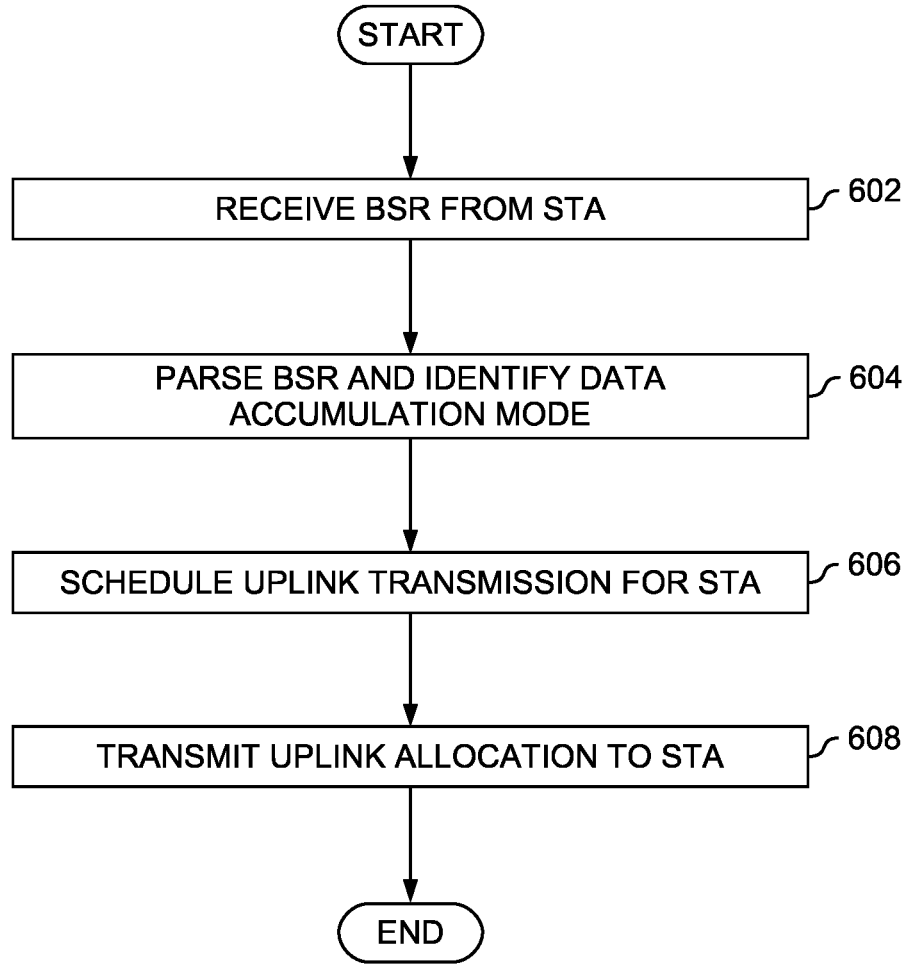
FIG. 6 is a flowchart illustrating state responsive uplink scheduling by an AP in a wireless network, according to one embodiment described herein.

FIG. 6 is a flowchart illustrating state responsive uplink scheduling by an AP in a wireless network, according to one embodiment described herein. At block 602, an AP (e.g., the AP 200 illustrated in FIG. 2) receives a BSR from an STA (e.g., the STA 250 illustrated in FIG. 2). The BSR can be a solicited BSR (e.g., provided in response to a BSRP as illustrated in FIG. 3) or an unsolicited BSR. In an embodiment, the AP receives a BSR including a scheduling mode identifier (e.g., a BSR transmitted by an STA at block 510 illustrated in FIG. 5).

At block 604, an uplink access scheduling module at the AP (e.g., the uplink access scheduling module 212 illustrated in FIG. 2) parses the BSR and identifies the data accumulation mode. For example, the BSR can include a bit, or a field of bits, identifying whether the data reflected in the BSR was accumulated at the STA during RA or SA. The uplink access scheduling module can parse the BSR and use this identifier to determine whether the data reflected in the BSR was accumulated at the STA during RA or SA.

At block 606, the uplink access scheduling module schedules uplink transmission for the STA. As discussed above, at block 606 the uplink access scheduling module can schedule any suitable uplink parameter for the STA (e.g., BSRP polling, resource allocation timing, resource unit allocation, etc.). In an embodiment, the uplink access scheduling module uses the identified data accumulation mode for scheduling. For example, as discussed above in relation to FIG. 4A-C, the uplink access scheduling module can provide improved scheduling in a number of scenarios (e.g., scenarios 430, 440, and 450 illustrated in FIGS. 4B-C) by identifying whether data reflected in a BSR is accumulated by an STA under SA or RA. The uplink access scheduling module can use the identifier in the BSR for improved scheduling.

At block 608, the uplink access scheduling module transmits the scheduled uplink allocation to the STA. In an embodiment, the STA uses the uplink allocation to transmit data to the AP (e.g., under SA or RA).

In an embodiment, as discussed above, the scheduling mode in which data is accumulated at an STA can be used for uplink scheduling by an AP. This is merely one example. Alternatively, or in addition, the scheduling mode can be used for analytics an assurance. For example, a network administrator could collect statistics on SA and RA usage by the STA (e.g., short term or long term statistics) and could use these statistics to improve the network. In an embodiment, a suitable machine learning (ML) model (e.g., a supervised ML model) could be trained to analyze scheduling mode data and infer improved network policies. For example, an ML model could identify STAs that are consistently forced to operate outside of SA and could infer improved policies for these STAs.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    allocating scheduled uplink access for a wireless station (STA) to a wireless access point (AP);
    receiving, at the AP, an unscheduled data transmission from the STA;
    receiving, at the AP from the STA, a buffer status report (BSR) reflecting data accumulated at the STA after the unscheduled data transmission from the STA, for uplink to the AP;
    determining to modify a scheduling allocation for the STA based on identifying, at the AP based on the BSR, a scheduling mode under which the data was accumulated at the STA, comprising:
        parsing an identifier in the BSR to determine whether the data was previously accumulated, prior to transmission of the BSR, at the STA under: (i) a random access (RA) scheduling mode or (ii) a scheduled access (SA) scheduling mode;
    modifying the scheduling allocation for the STA by scheduling, at the AP, an uplink parameter for the STA, based on the identified scheduling mode, wherein the uplink parameter relates to at least one of: (i) an uplink transmission for the STA or (ii) a buffer status poll for the STA; and
    transmitting, from the AP to the STA, an allocation relating to the scheduled uplink parameter for the STA.

2. The method of claim 1, wherein the scheduling mode comprises the RA mode.

3. The method of claim 2, wherein the scheduling, at the AP, the uplink parameter for the STA is further based on determining that the scheduling mode comprises an RA mode and the BSR comprises a solicited BSR.

4. The method of claim 1, wherein the scheduling mode comprises the SA mode.

5. The method of claim 4, wherein the scheduling, at the AP, the uplink parameter for the STA is further based on determining that the scheduling mode comprises an SA mode and the BSR comprises an unsolicited BSR.

6. The method of claim 5, wherein the scheduling, at the AP, the uplink parameter for the STA is further based on determining that the unsolicited BSR is transmitted under an SA mode.

7. The method of claim 5, wherein the scheduling, at the AP, the uplink parameter for the STA is further based on determining that the unsolicited BSR is transmitted under an RA mode.

8. The method of claim 1, wherein the AP and the STA communicate using 802.11ax.

9. The method of claim 1, wherein scheduling, at the AP, the uplink parameter for the STA based on the identified scheduling mode comprises allocating a plurality of resource units for orthogonal frequency-division multiple access (OFDMA) transmission from the STA to the AP.

10. A computer program product, comprising:
a non-transitory computer-readable storage medium having computer-readable program code embodied therewith, the computer-readable program code executable by one or more computer processors to perform an operation, the operation comprising:
allocating scheduled uplink access for a wireless station (STA) to a wireless access point (AP);
receiving, at the AP, an unscheduled data transmission from the STA;
receiving, at the AP from the STA, a buffer status report (BSR) reflecting data accumulated at the STA after the unscheduled data transmission from the STA, for uplink to the AP;
determining to modify a scheduling allocation for the STA based on identifying, at the AP based on the BSR, a scheduling mode under which the data was accumulated at the STA, comprising:
parsing an identifier in the BSR to determine whether the data was previously accumulated, prior to transmission of the BSR, at the STA under: (i) a random access (RA) scheduling mode or (ii) a scheduled access (SA) scheduling mode;
modifying the scheduling allocation for the STA by scheduling, at the AP, an uplink parameter for the STA, based on the identified scheduling mode, wherein the uplink parameter relates to at least one of: (i) an uplink transmission for the STA or (ii) a buffer status poll for the STA; and
transmitting, from the AP to the STA, an allocation relating to the scheduled uplink parameter for the STA.

11. The computer program product of claim 10, wherein the scheduling, at the AP, the uplink parameter for the STA is further based on determining that the scheduling mode comprises the RA mode and the BSR comprises a solicited BSR.

12. The computer program product of claim 10, wherein the scheduling, at the AP, the uplink parameter for the STA is further based on determining that the scheduling mode comprises the SA mode and the BSR comprises an unsolicited BSR.

13. A wireless access point (AP), comprising:
a processor; and
a memory storing a program, which, when executed on the processor, performs an operation, the operation comprising:
allocating scheduled uplink access for a wireless station (STA) to the AP;
receiving an unscheduled data transmission from the STA
receiving, from the STA, a buffer status report (BSR) reflecting data accumulated at the STA after the unscheduled data transmission from the STA, for uplink to the AP;
determining to modify a scheduling allocation for the STA based on identifying, based on the BSR, a scheduling mode under which the data was accumulated at the STA, comprising:
parsing an identifier in the BSR to determine whether the data was previously accumulated, prior to transmission of the BSR, at the STA under: (i) a random access (RA) scheduling mode or (ii) a scheduled access (SA) scheduling mode;
modifying the scheduling allocation for the STA by scheduling, at the AP, an uplink parameter for the STA, based on the identified scheduling mode, wherein the uplink parameter relates to at least one of: (i) an uplink transmission for the STA or (ii) a buffer status poll for the STA; and
transmitting, to the STA, an allocation relating to the scheduled uplink parameter for the STA.

14. The AP of claim 13, wherein the scheduling the uplink parameter for the STA is further based on determining that the scheduling mode comprises the RA mode and the BSR comprises a solicited BSR.

15. The AP of claim 13, wherein the scheduling the uplink parameter for the STA is further based on determining that the scheduling mode comprises the SA mode and the BSR comprises an unsolicited BSR.

16. The AP of claim 13, wherein the AP and the STA communicate using 802.11ax.

17. The AP of claim 13, wherein scheduling the uplink parameter for the STA based on the identified scheduling mode comprises allocating a plurality of resource units for orthogonal frequency-division multiple access (OFDMA) transmission from the STA to the AP.

* * * * *